(12) United States Patent
Kim et al.

(10) Patent No.: US 9,881,713 B2
(45) Date of Patent: Jan. 30, 2018

(54) COATING COMPOSITION FOR TRANSPARENT ELECTRODE PASSIVATION LAYER AND TRANSPARENT ELECTRODE HAVING PASSIVATION LAYER

(71) Applicant: KOREA INSTITUTE OF MACHINERY AND MATERIALS, Daejeon (KR)

(72) Inventors: Chang Su Kim, Changwon-si (KR); Dong Ho Kim, Changwon-si (KR); Myung Kwan Song, Ulsan (KR); Han-Soo Shim, Seoul (KR); Yu Hong Cheon, Daegu (KR)

(73) Assignee: KOREA INSTITUTE OF MACHINERY AND MATERIALS, Daejeon (KR)

( * ) Notice: Subject to any disclaimer, the term of this patent is extended or adjusted under 35 U.S.C. 154(b) by 141 days.

(21) Appl. No.: 14/983,976

(22) Filed: Dec. 30, 2015

(65) Prior Publication Data

US 2016/0276058 A1    Sep. 22, 2016

(30) Foreign Application Priority Data

Mar. 20, 2015  (KR) ................ 10-2015-0038957
Dec. 3, 2015   (KR) ................ 10-2015-0171334

(51) Int. Cl.

| | | |
|---|---|---|
| *H01B 3/30* | (2006.01) | |
| *C09D 7/12* | (2006.01) | |
| *H01B 3/00* | (2006.01) | |
| *H01B 3/10* | (2006.01) | |
| *C09D 1/00* | (2006.01) | |
| *C08K 5/5415* | (2006.01) | |

(52) U.S. Cl.
CPC ............ *H01B 3/307* (2013.01); *C09D 1/00* (2013.01); *C09D 7/1233* (2013.01); *H01B 3/004* (2013.01); *H01B 3/105* (2013.01); *C08K 5/5415* (2013.01)

(58) Field of Classification Search
CPC ........................................... B41J 2/17
USPC .................................. 347/96; 428/469
See application file for complete search history.

(56) References Cited

U.S. PATENT DOCUMENTS

2016/0118253 A1* 4/2016 Takata ............ H01L 21/02554
257/43

FOREIGN PATENT DOCUMENTS

KR    10-2014-0094415 A    7/2014

OTHER PUBLICATIONS

D. S. Ghosh, et al; "Solution Processed Metallic Nanowire Based Transparent Electrode Capped With a Multifunctional Layer"; Applied Physics Letters, 102 221111-1 to 221111-4, 2013; 5 pgs.
Donghwa Lee, et al.; "Highly Stable and Flexible Silver Nanowire-Graphene Hybrid Transparent Conducting Electrodes for Emerging Optoelectronic Devices"; RSC Publishing; The Royal Society of Chemistry; Published Jun. 26, 2013; 6 pgs.

* cited by examiner

*Primary Examiner* — Terressa Boykin
(74) *Attorney, Agent, or Firm* — Maier & Maier, PLLC

(57) ABSTRACT

Provided is a coating composition for a transparent electrode passivation layer, the coating composition including a metal oxide and at least one selected from the group consisting of ethylene glycol, propylene glycol, diethylene glycol, triethylene glycol, and tetraethylene glycol. When a passivation layer formed using the coating composition for a transparent electrode passivation layer according to the present invention is applied to a transparent electrode, the passivation layer is capable of ensuring the heat resistance and durability of the transparent electrode while maintaining the transmittance of the transparent electrode. Particularly, the coating composition for a transparent electrode passivation layer according to the present invention exhibits excellent hardness.

10 Claims, 11 Drawing Sheets

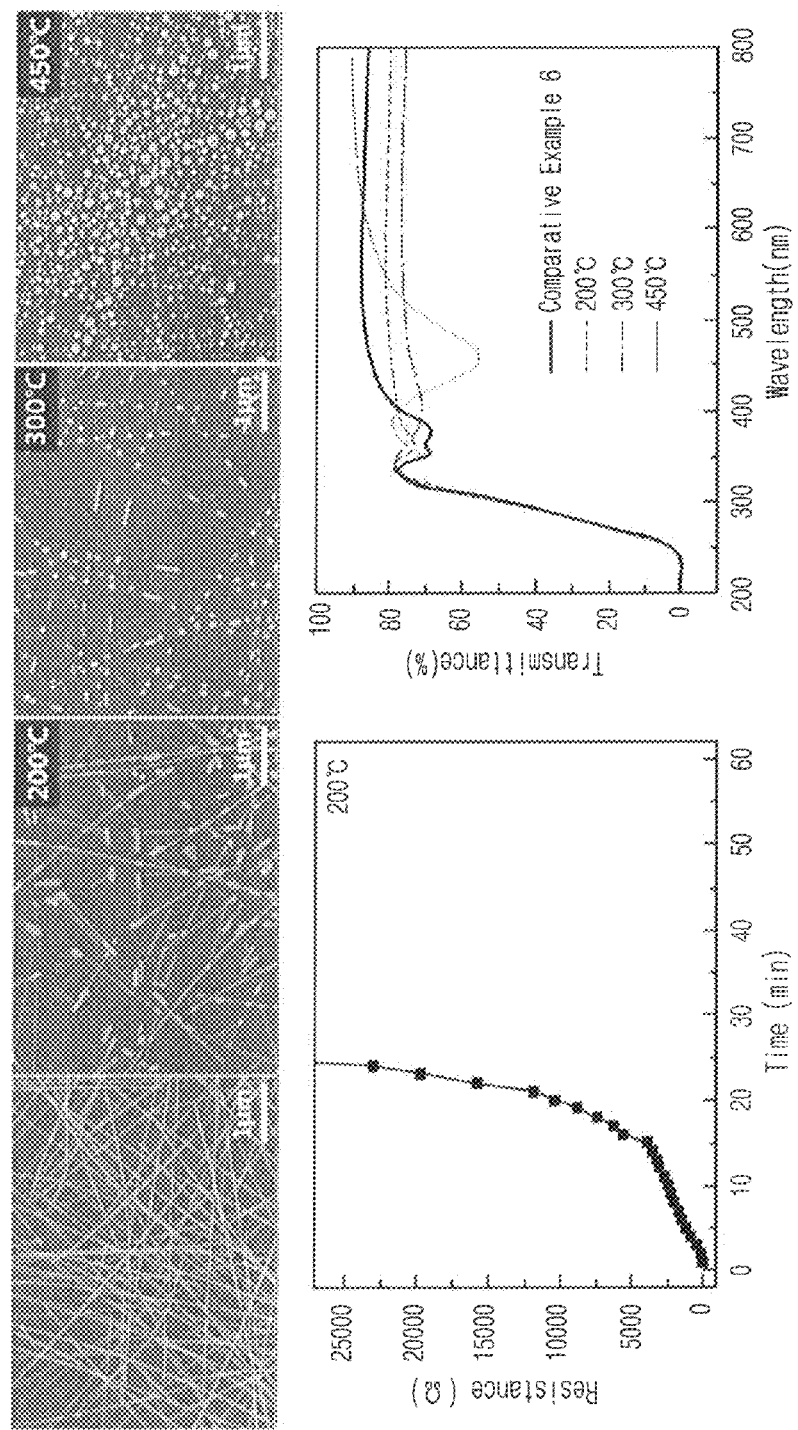
[Fig. 1]

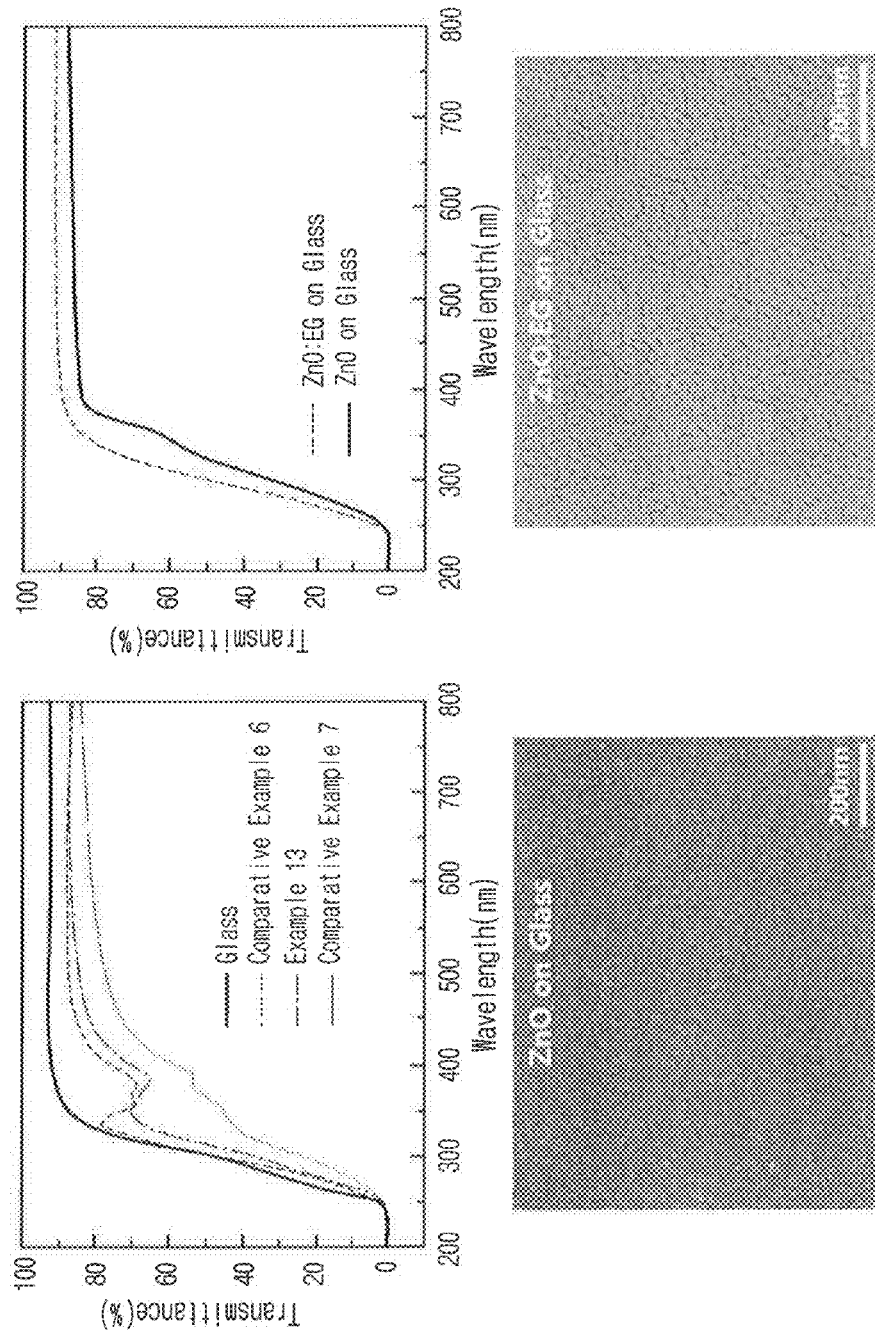
[Fig. 2]

[Fig. 3]
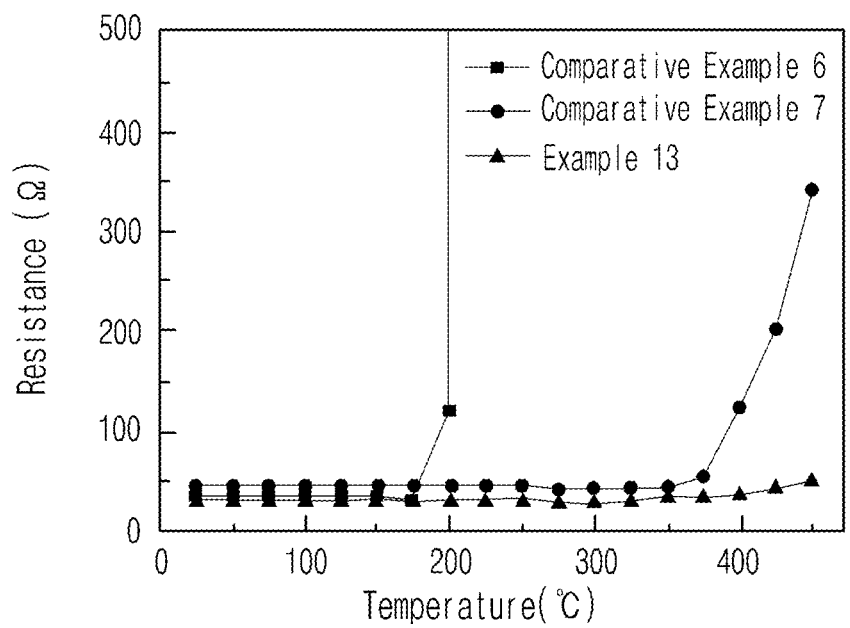
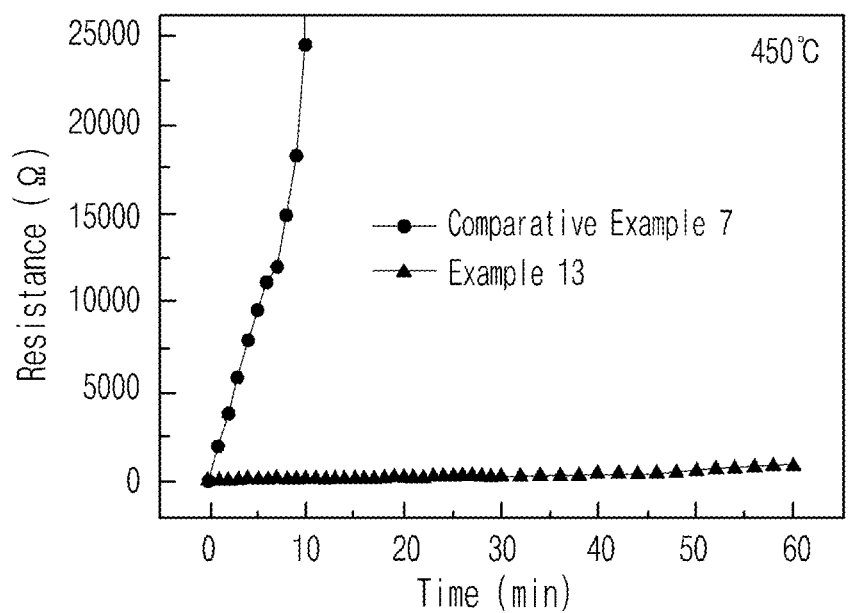

[Fig. 4]
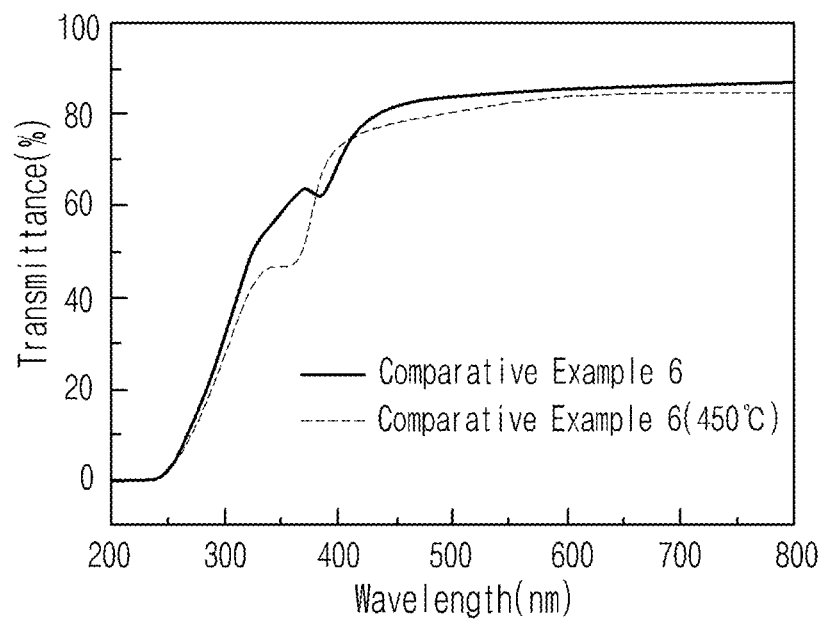
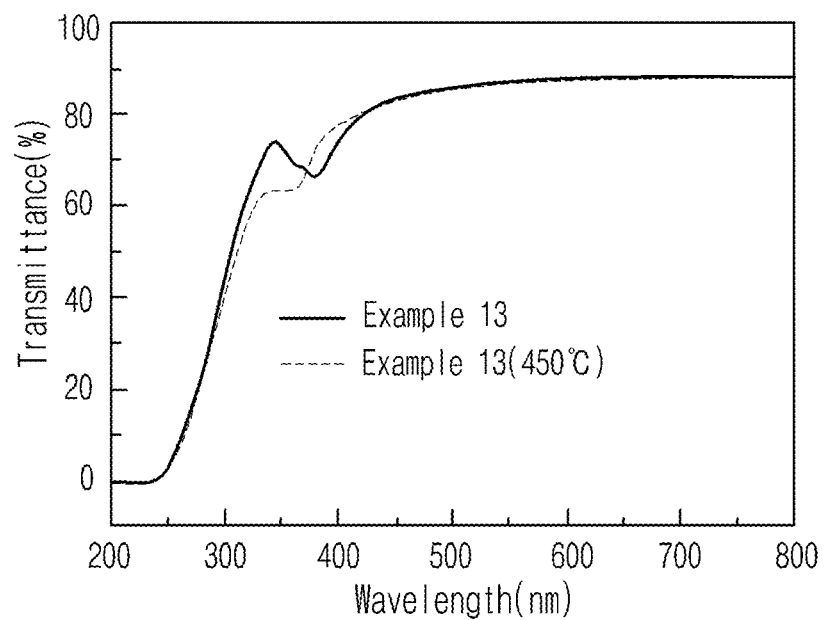

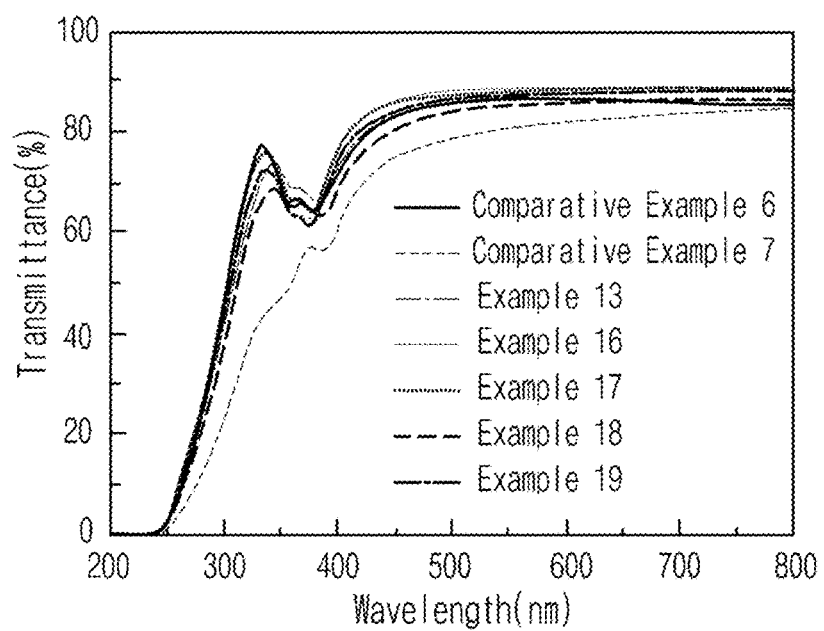
[Fig. 5]

[Fig. 6]
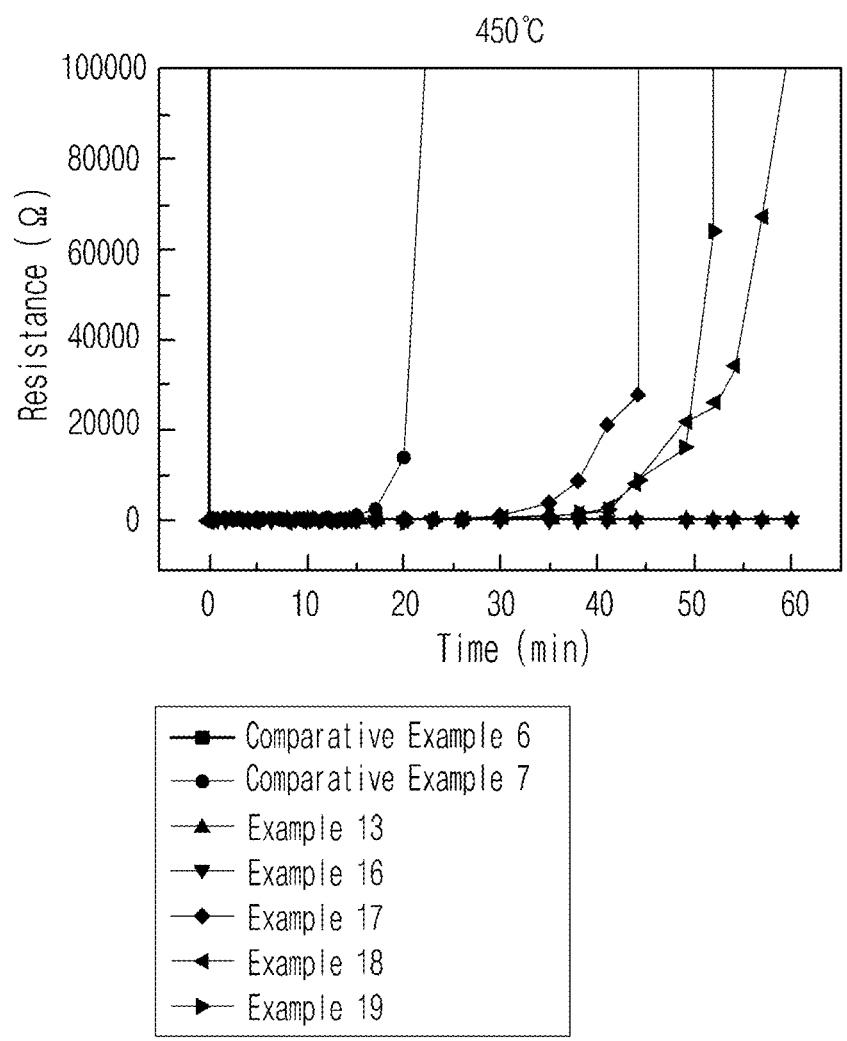

[Fig. 7]
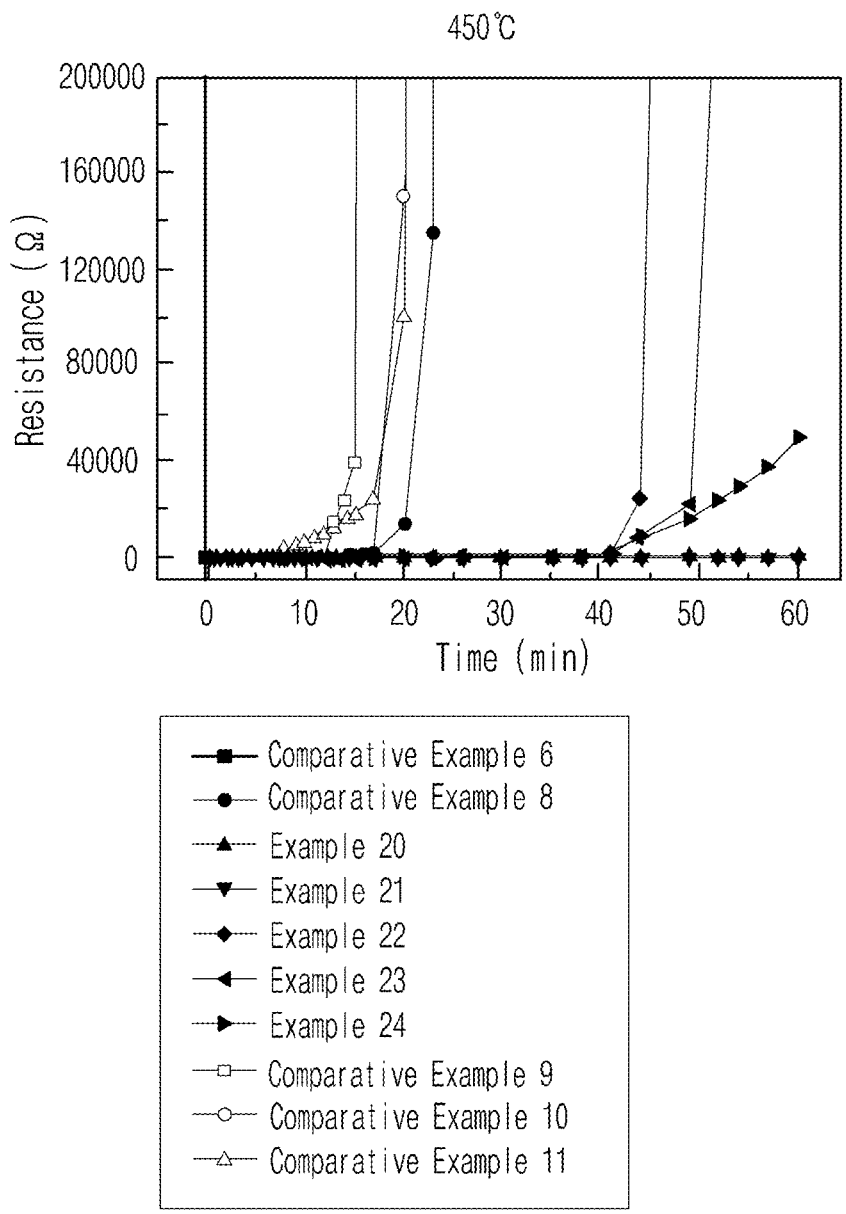

[Fig. 8]
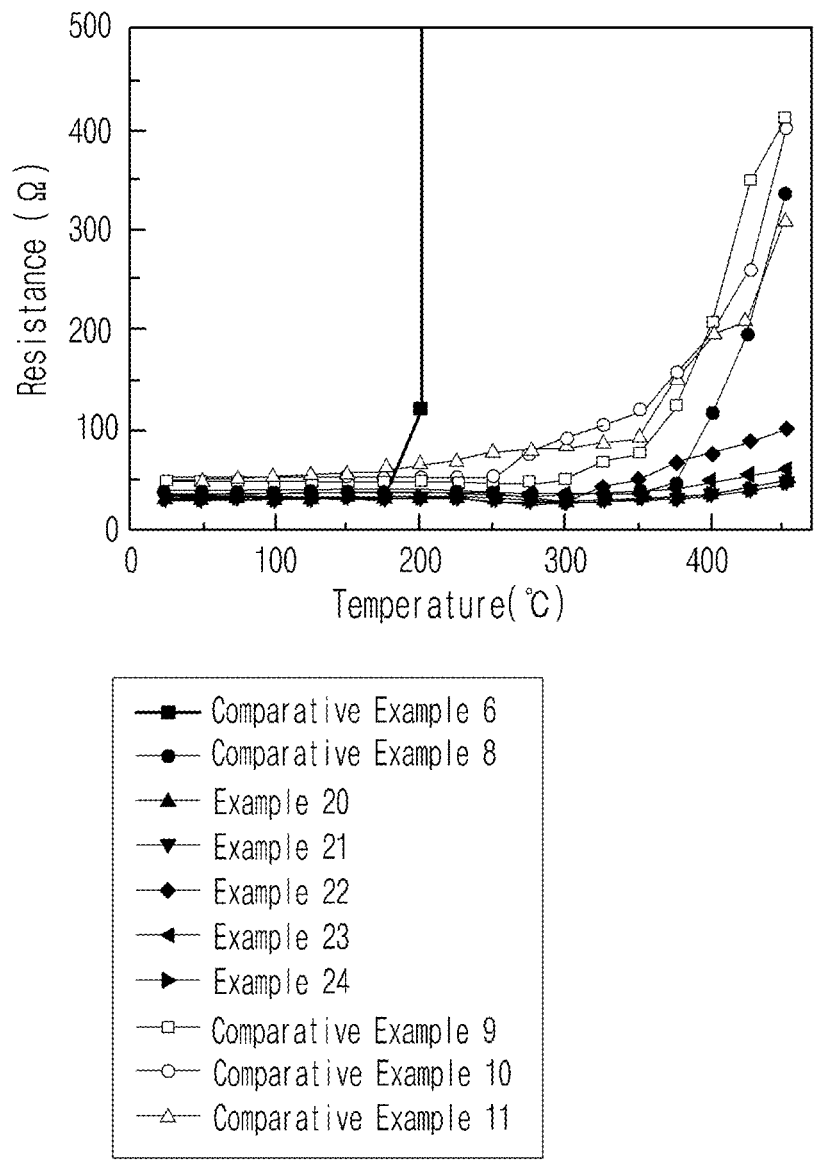

[Fig. 9]
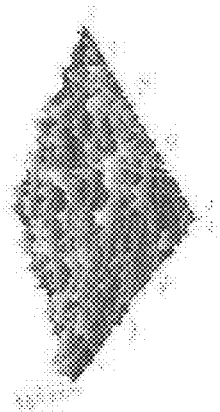
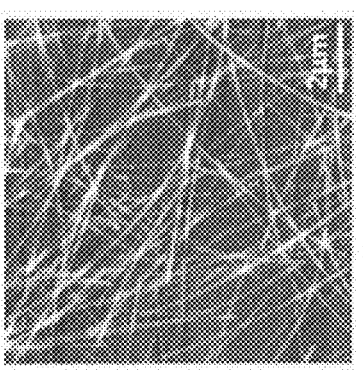
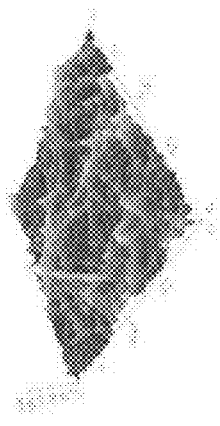
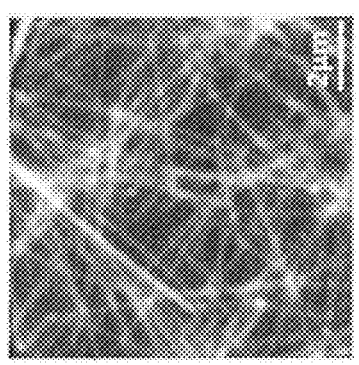
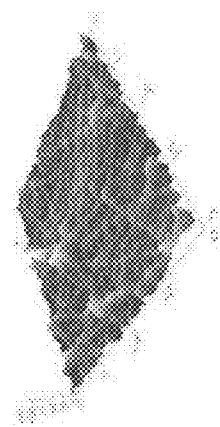
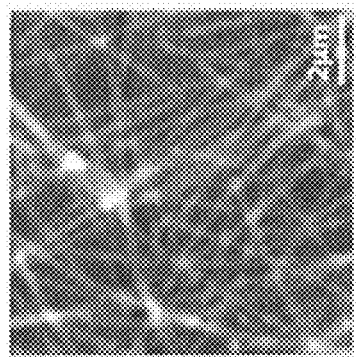

[Fig. 10]
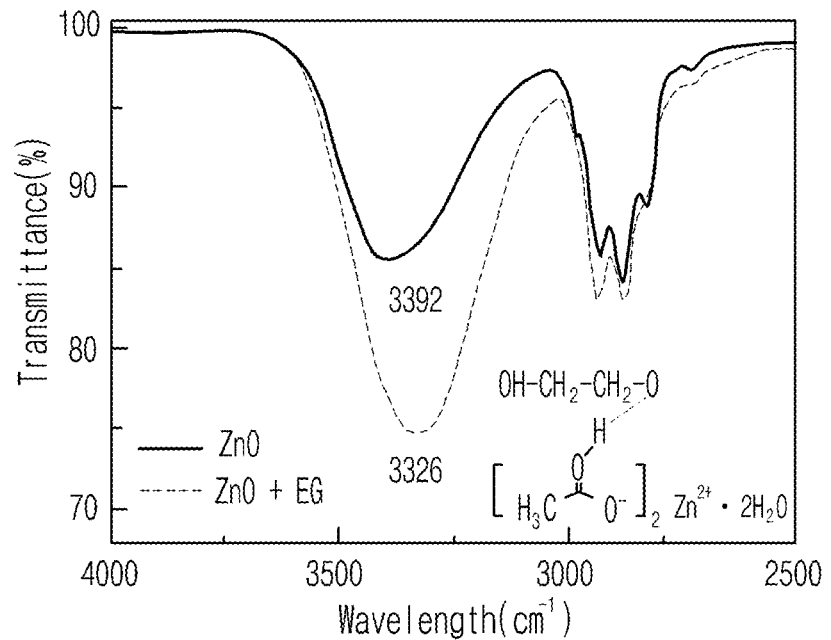
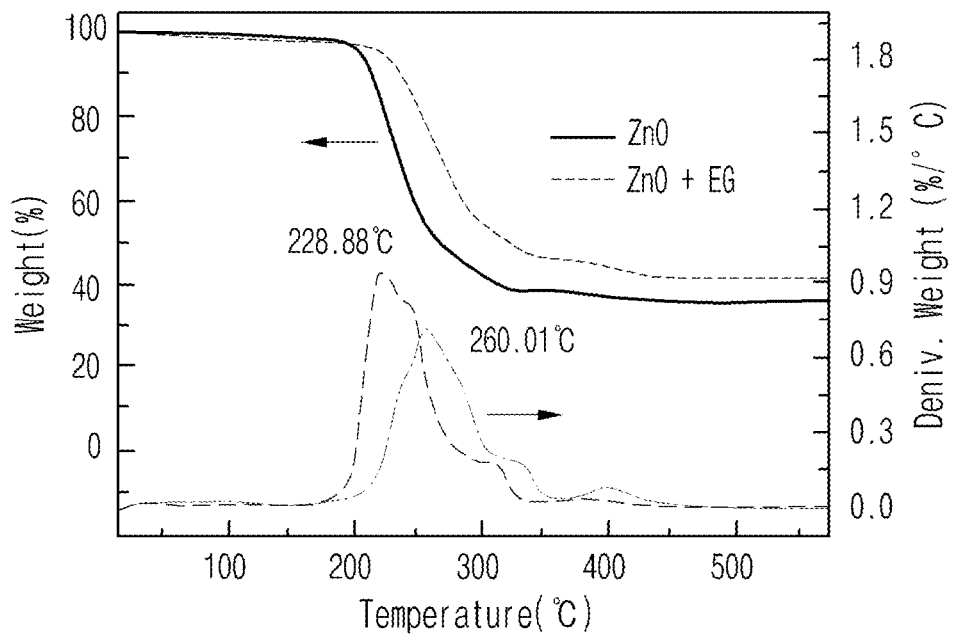

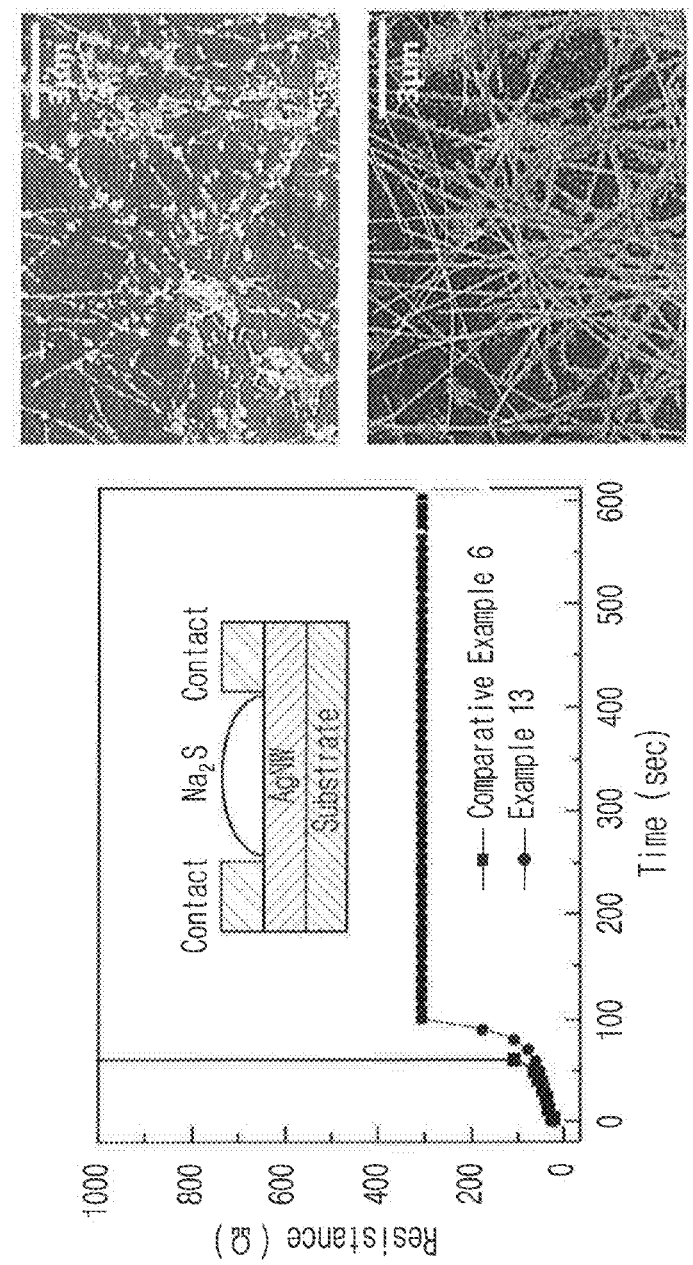
[Fig. 11]

COATING COMPOSITION FOR TRANSPARENT ELECTRODE PASSIVATION LAYER AND TRANSPARENT ELECTRODE HAVING PASSIVATION LAYER

BACKGROUND OF THE INVENTION

1. Field of the Invention

The present disclosure relates to a coating composition for a transparent electrode passivation layer and a transparent electrode having a passivation layer.

2. Description of the Related Art

Indium tin oxide (ITO) is generally used in transparent conductive films being currently used for transparent electrodes in the touch panel market of display industries. This is because ITO has excellent transparency in the entire visible light region, has a relatively low sheet resistance, and has an appropriate work function for injecting and collecting charge carriers in organic semiconductors. However, ITO has the following disadvantages: ITO is synthesized through a high temperature process, and thus cannot be used on a plastic substrate; ITO is very expensive; and ITO cannot be used for a flexible transparent conductive film due to its fragile nature.

Therefore, researches on materials which are capable of replacing ITO and have equivalent performances are being actively conducted.

Although there have been attempts to use a thin film made by sputtering a metal, such as gold, silver, and copper, as a transparent electrode, there are problems in that the thin film has a low light transmittance in the visible light region while having excellent electrical conductivity, and exhibits poor adhesion with a lower substrate. Furthermore, there are problems in that a ZnO thin film has an electrical conductivity lower than that of ITO while being an inexpensive material, and an ATO thin film, in which a small amount of Sb is added to $SnO_2$, is difficult to etch and has a high sintering temperature.

Furthermore, although a method for producing an oxidation film using sol-gel synthesis is being used, the method is problematic in that the electric conductivity is still low and a high temperature process in which the sintering temperature is above 350° C. is required.

Thus, researches for applying metal nanowires, particularly silver nanowires having excellent electrical conductivity and thermal conductivity, to a transparent electrode are being actively conducted.

Metal nanowires serve to ensure electrical conductivity by forming a network during forming of a transparent electrode. As the metal nanowire network is more densely formed, the electrical conductivity of the transparent electrode is improved. However, there are problems in that the visible light transmittance of the transparent electrode is reduced and excessive costs are required. Even if a conductive network is formed using metal nanowires, the metal nanowires are broken due to thermodynamic instability even under the condition of only a temperature of about 200° C., and electrical and optical properties thus drastically deteriorate. That is, such a network disconnection inevitably occurs, and empty spaces between the networks remain as non-conductive regions having no conductivity. Furthermore, the metal nanowires as a nanostructure are more active than conventional materials, and thus highly prone to oxidation and corrosion when exposed to the atmosphere without a passivation layer. Particularly, while silver nanowires have a highly conductive property and are transparent in the visible light region, it is known that the resistance increases by about 15 to 20% due to the oxidation and corrosion in the atmosphere. Thus, there was a problem in that additional antioxidants or a plurality of passivation layers were required in order to prevent the oxidation and corrosion.

In order to improve the heat resistance and durability of such metal nanowires, researches for using an oxide (ZnO, IZO, or AZO), graphene, carbon nanotube (CNT), or the like as a passivation layer are being conducted.

As a specific example, D. S. Ghosh et al. suggest zinc oxide (ZnO) as a passivation layer of a transparent electrode including a metal nanowire layer (Applied physics letters, 102, 221111, 2013). Also, Donghwa Lee et al. suggest graphene as a passivation layer of a transparent electrode including a metal nanowire layer (nanoscale, 5, 7750, 2013). However, conventional passivation layers lead to a decrease in the transmittance of a transparent electrode including a silver nanowire layer.

Also, KR Patent Publication No. 10-2014-0094415 discloses a coating composition for a transparent conductive film, a transparent conductive film, and a method for fabricating the same. The prior art literature discloses a magnesium fluoride sol, an inorganic sol, an inorganic-inorganic composite sol, and an organic-inorganic hybrid sol as a coating composition for a passivation layer for protecting a metal nanowire electrode. However, the coating layer for a passivation layer disclosed in the literature has a problem of insufficient heat resistance and hardness.

Thus, while investigating a passivation layer capable of ensuring both the electrical conductivity and the light transmittance of a transparent electrode including a metal nanowire layer, the present inventors developed a coating composition for a transparent electrode passivation layer, the coating composition including a metal oxide and a specific compound of ethylene glycol or the like. The present inventors found that when a passivation layer was prepared using the coating composition for a transparent electrode passivation layer and was applied to a transparent electrode, the passivation layer was capable of ensuring the heat resistance and durability of the transparent electrode while maintaining the transmittance of the transparent electrode, and finally completed the present invention.

SUMMARY OF THE INVENTION

One object of the present invention is to provide a composition for a transparent electrode passivation layer, the composition being capable of improving the heat resistance and durability of a transparent electrode while maintaining the transmittance of the transparent electrode.

Another object of the present invention is to provide a composition for a transparent electrode passivation layer, the composition exhibiting excellent hardness.

In order to achieve the objects, the present invention provides a coating composition for a transparent electrode passivation layer, the coating composition including: a metal oxide; and at least one selected from the group consisting of ethylene glycol, propylene glycol, diethylene glycol, triethylene glycol, and tetraethylene glycol.

The present invention also provides a method for preparing a coating composition for a transparent electrode passivation layer, the method including:

preparing a sol-gel solution including a metal oxide (step 1); and adding at least one selected from the group consisting of ethylene glycol, propylene glycol, diethylene glycol, triethylene glycol, and tetraethylene glycol to the sol-gel solution prepared in step 1 (step 2).

Furthermore, the present invention provides a method for preparing a transparent electrode, the method including:

applying a metal nanowire-dispersed liquid including metal nanowires to a substrate and drying the resultant to prepare an electrode including a metal nanowire layer (step 1); and applying the coating composition for a transparent electrode passivation layer to the top of the electrode prepared in step 1 (step 2).

Furthermore, the present invention provides a transparent electrode including: an electrode including a metal nanowire layer; and a passivation layer which is coated on the top of the electrode including a metal nanowire layer and which includes a metal oxide and at least of one selected from the group consisting of ethylene glycol, propylene glycol, diethylene glycol, triethylene glycol, and tetraethylene glycol.

When a passivation layer formed using the coating composition for a transparent electrode passivation layer according to the present invention is applied to a transparent electrode, the passivation layer is capable of ensuring the heat resistance and durability of the transparent electrode while maintaining the transmittance of the transparent electrode. Particularly, the coating composition for a transparent electrode passivation layer according to the present invention exhibits excellent hardness.

BRIEF DESCRIPTION OF THE DRAWINGS

The above and other objects, features and other advantages of the present invention will be more clearly understood from the following detailed description taken in conjunction with the accompanying drawings, in which:

FIG. 1 is SEM images of a silver nanowire transparent electrode prepared in Comparative Example 6, and graphs showing the resistance and the transmittance thereof, where the results were obtained after the silver nanowire transparent electrode was independently heated to 200° C., 300° C., and 450° C., the resistance was measured using four point probe and multimeter, and the transmittance was analyzed using UV-Vis spectroscopy;

FIG. 2 is SEM images and graphs of UV-Vis spectroscopy analysis, using: electrodes prepared in Example 13 according to the present invention and Comparative Examples 6 and 7; glass; zinc oxide (ZnO)-coated glass; and zinc oxide & ethylene glycol (EG)-coated glass;

FIGS. 3 to 6 are graphs showing the resistances and the transmittances of electrodes prepared in Examples 13 and 16 to 19 according to the present invention and Comparative Examples 6 and 7, where the resistance was measured using four point probe and multimeter, and the transmittance was analyzed using UV-Vis spectroscopy;

FIGS. 7 and 8 graphs showing the resistances of electrodes prepared in Examples 20 to 24 according to the present invention and Comparative Examples 6 and 8 to 11, where the resistance was measured using four point probe and multimeter;

FIG. 9 is atomic force microscope (AFM) images of electrodes prepared in Examples 13 according to the present invention and Comparative Examples 6 and 8;

FIG. 10 is graphs showing the results analyzed using differential thermogravimetric analysis (DTG) and thermogravimetry analysis (TGA) for zinc oxide (ZnO) and a mixture of zinc oxide and ethylene glycol (EG); and FIG. 11 is a graph showing resistance variations according to time after sodium sulfide ($Na_2S$) is applied to electrodes prepared in Example 13 according to the present invention and Comparative Examples 6 and 7.

DESCRIPTION OF THE PREFERRED EMBODIMENTS

Features and advantages of the present invention will be more clearly understood by the following detailed description of the present preferred embodiments by reference to the accompanying drawings. It is first noted that terms or words used herein should be construed as meanings or concepts corresponding with the technical sprit of the present invention, based on the principle that the inventor can appropriately define the concepts of the terms to best describe his own invention. Also, it should be understood that detailed descriptions of well-known functions and structures related to the present invention will be omitted so as not to unnecessarily obscure the important point of the present invention.

The present invention provides a coating composition for a transparent electrode passivation layer, the coating composition including: a metal oxide; and at least one selected from the group consisting of ethylene glycol, propylene glycol, diethylene glycol, triethylene glycol, and tetraethylene glycol.

Hereinafter, the coating composition for a transparent electrode passivation layer according to the present invention will be described in detail.

The coating composition for a transparent electrode passivation layer according to the present invention is characterized by including: a metal oxide; and at least one compound of ethylene glycol, propylene glycol, diethylene glycol, triethylene glycol, or tetraethylene glycol.

Even if a transparent electrode is produced by forming a conductive network using metal nanowires, there is a problem in that the metal nanowires are broken due to thermodynamic instability even under the condition of only a temperature of about 200° C., and electrical and optical properties thus drastically deteriorate. Furthermore, the metal nanowires as a nanostructure are more active than conventional materials, and thus highly prone to oxidation and corrosion when exposed to the atmosphere without a passivation layer.

In order to improve the heat resistance and durability of such metal nanowires, an oxide (ZnO, IZO, or AZO), graphene, carbon nanotube (CNT), or the like may be used as a passivation layer. However, conventional passivation layers are problematic in that the transmittance of a transparent electrode is reduced and it is difficult to obtain sufficient hardness.

Thus, in the present invention, the coating composition for a transparent electrode passivation layer includes at least one compound of ethylene glycol, propylene glycol, diethylene glycol, triethylene glycol, or tetraethylene glycol, in addition to a metal oxide, and may further include an alkoxysilane-based coupling agent.

Specifically, it is preferable that the transparent electrode includes a metal nanowire layer. The transparent electrode including a metal nanowire layer has a problem in terms of heat resistance and durability as mentioned above. Also, there is a problem of insufficient hardness. The composition according to the present invention is capable of solving the problems that occur in the transparent electrode including a metal nanowire layer.

The metal of the metal nanowire may be silver, gold, copper, aluminum, nickel, tin, palladium, platinum, zinc, iron, indium, magnesium, or the like. As a preferred example, the metal nanowire may be a silver nanowire having excellent electrical conductivity and thermal conductivity.

Particularly, when ethylene glycol or propylene glycol is used as the compound, the composition for forming a passivation layer may exhibit excellent heat resistance and durability.

Furthermore, the alkoxysilane-based coupling agent may be a compound expressed by formula 1 below

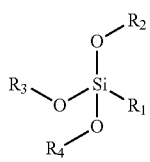

<Formula 1> where $R_1$ is a linear or branched alkyl, alkenyl, alkynyl, or aryl of $C_{1-12}$, the alkyl, alkenyl, alkynyl, or aryl may have at least one substituent of an acryl group, a methacrylic group, an alkoxy group, an amino group, a mercapto group, a phosphonate group, or an epoxy group, at least one carbon atom in the alkyl, alkenyl, alkynyl, or aryl may be substituted with at least one hetero-element selected from the group consisting of N, O, and S, and $R_2$, $R_3$, and $R_4$ are independently a hydrogen or a linear alkyl of $C_{1-4}$ or a branched alkyl of $C_{2-4}$.

As a specific example, the alkoxysilane-based coupling agent may be (3-glycidoxypropyl) methyldiethoxysilane (GPTMS), vinyltriethoxysilane (VIES), phenyl trimethoxysilane (PTMS), methyltriethoxysilane (MTES), methyltrimethoxysilane (MTMS), tetramethyl orthosilicate (TMOS), tetraethyl orthosilicate (TEOS), γ-mercaptopropyl trimethoxysilane (MPTMS), γ-methacryloxyproply trimethoxysilane (MAPTS), diethylphosphonatoethyl triethoxysilane (PHS), 3-aminopropyl trimethoxysilane (APS), 3-(2-aminoethyl)aminopropyl trimethoxysilane (AEAPS), bis-[3-(triethoxysilyl)-propyl]tetrasulfide (BTSTS), or the like.

The coating composition for a transparent electrode passivation layer according to the present invention further includes the alkoxysilane-based coupling agent, thereby being capable of exhibiting excellent hardness through a coupling reaction with the metal oxide.

Furthermore, the metal oxide may be zinc oxide, titanium oxide, magnesium oxide, aluminum oxide, silicon oxide, or the like, and as a preferred example, may be zinc oxide (ZnO).

Furthermore, in the coating composition for a transparent electrode passivation layer, the metal oxide and the compound expressed by formula 1 are preferably mixed at a weight ratio of 1:0.1 to 4.0, more preferably 1:0.25 to 2.0, and the most preferably 1:0.5 to 1.5. When the ratio of the metal oxide to the compound expressed by formula 1 is beyond the above range, there is a problem in that the electrical conductivity or the transmittance of the transparent electrode is reduced due to a passivation layer produced with the composition.

Furthermore, with respect to the total weight of the composition, the content of the alkoxysilane-based coupling agent is preferably 2.5 wt % to 4.0 wt %, and more preferably 2.5 wt % to 3.5 wt %. When the content of the alkoxysilane-based coupling agent is less than 2.5 wt %, there is a problem of insufficient hardness. On the other hand, when the content of the alkoxysilane-based coupling agent is more than 4.0 wt %, there is a problem of deterioration in optical properties or an increase in sheet resistance.

The present invention also provides a method for preparing a coating composition for a transparent electrode passivation layer, the method including: preparing a sol-gel solution including a metal oxide (step 1); and adding at least one selected from the group consisting of ethylene glycol, propylene glycol, diethylene glycol, triethylene glycol, and tetraethylene glycol to the sol-gel solution prepared in step 1 (step 2).

Hereinafter, the method for preparing a coating composition for a transparent electrode passivation layer according to the present invention will be described in detail for each step.

First, in the method for preparing a coating composition for a transparent electrode passivation layer according to the present invention, step 1 is a step for preparing a sol-gel solution including a metal oxide.

In step 1, a sol-gel solution, which includes a metal oxide and is used for a transparent electrode passivation layer, is prepared.

Specifically, the preparing of the sol-gel solution including a metal oxide in step 1, as a specific example, may be made by a sol-gel reaction in which a metal oxide precursor, a stabilizer, and a solvent are used.

The metal oxide precursor may be a metal oxide precursor that is commonly used to perform a sol-gel reaction, and as a specific example for preparing a sol-gel solution including zinc oxide, zinc acetate dihydrate ($Zn(CH_3COO)_2 \cdot H_2O$) may be used.

Furthermore, the stabilizer may be any compound that is commonly used in a sol-gel reaction for preparing a metal oxide, may be a compound having an amine group ($-NH_2$) or a hydroxyl group ($-OH$), and as a specific example, may be monoethanolamine ($NH_2CH_2CH_2OH$).

Furthermore, the solvent is preferably a solvent having a hydroxyl group, but is not limited thereto, may be a solvent that is commonly used in a sol-gel reaction, and as a specific example, may be 2-methoxyethanol ($CH_3OCH_2CH_2OH$).

The metal oxide in step 1 may be zinc oxide, titanium oxide, magnesium oxide, aluminum oxide, silicon oxide, or the like, and as a preferred example, may be zinc oxide (ZnO).

Next, in the method for preparing a coating composition for a transparent electrode passivation layer according to the present invention, step 2 is a step for adding at least one selected from the group consisting of ethylene glycol, propylene glycol, diethylene glycol, triethylene glycol, and tetraethylene glycol to the sol-gel solution prepared in step 1.

In order to improve the heat resistance and durability of metal nanowires, a passivation layer was conventionally formed of only an oxide (ZnO, IZO, or AZO), graphene, carbon nanotube (CNT), or the like. However, the conventional passivation layer formed of the aforementioned material was problematic in that the transmittance of a transparent electrode was reduced and the hardness of the passivation layer was insufficient.

Thus, in step 2 of the present invention, as a coating composition for a transparent electrode passivation layer, at least one compound of ethylene glycol, propylene glycol, diethylene glycol, triethylene glycol, or tetraethylene glycol is added to the sol-gel solution including a metal oxide. An alkoxysilane-based coupling agent may be further added in order to improve the hardness of the passivation layer.

Specifically, when ethylene glycol or propylene glycol is used as the compound in step 2, the composition for forming a passivation layer may exhibit excellent heat resistance and durability.

Furthermore, in step 2, the sol-gel solution and the compound are preferably mixed at a weight ratio of 1:0.1 to 4.0, more preferably 1:0.25 to 2.0, and the most preferably 1:0.5 to 1.5. In step 2, when the ratio of the sol-gel solution including a metal oxide to the compound expressed by formula 1 is beyond the above range, there is a problem in that the electrical conductivity or the transmittance of the transparent electrode is reduced due to a passivation layer produced with the composition.

Furthermore, the alkoxysilane-based coupling agent may be a compound expressed by formula 1 below

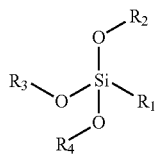
<Formula 1> where $R_1$ is a linear or branched alkyl, alkenyl, alkynyl, or aryl of $C_{1-12}$, the alkyl, alkenyl, alkynyl, or aryl may have at least one substituent of an acryl group, a methacrylic group, an alkoxy group, an amino group, a mercapto group, a phosphonate group, or an epoxy group, at least one carbon atom in the alkyl, alkenyl, alkynyl, or aryl may be substituted with at least one hetero-element selected from the group consisting of N, O, and S, and $R_2$, $R_3$, and $R_4$ are independently a hydrogen or a linear alkyl of $C_{1-4}$ or a branched alkyl of $C_{2-4}$.

As a specific example, the alkoxysilane-based coupling agent may be (3-glycidoxypropyl) methyldiethoxysilane (GPTMS), vinyltriethoxysilane (VIES), phenyl trimethoxysilane (PTMS), methyltriethoxysilane (MTES), methyltrimethoxysilane (MTMS), tetramethyl orthosilicate (TMOS), tetraethyl orthosilicate (TEOS), γ-mercaptopropyl trimethoxysilane (MPTMS), γ-methacryloxyproply trimethoxysilane (MAPTS), diethylphosphonatoethyl triethoxysilane (PHS), 3-aminopropyl trimethoxysilane (APS), 3-(2-aminoethyl)aminopropyl trimethoxysilane (AEAPS), bis-[3-(triethoxysilyl)-propyl]tetrasulfide (BTSTS), or the like.

The coating composition for a transparent electrode passivation layer according to the present invention further includes the alkoxysilane-based coupling agent, thereby being capable of exhibiting excellent hardness through a coupling reaction with the metal oxide.

Furthermore, with respect to the total weight of the solution including the sol-gel solution and at least one compound of ethylene glycol, propylene glycol, diethylene glycol, triethylene glycol, or tetraethylene glycol, the alkoxysilane-based coupling agent is added in an amount of preferably 2.5 wt % to 4.0 wt %, and more preferably 2.5 wt % to 3.5 wt %. When the content of the alkoxysilane-based coupling agent is less than 2.5 wt %, there is a problem of insufficient hardness. On the other hand, when the content of the alkoxysilane-based coupling agent is more than 4.0 wt %, there is a problem of deterioration in optical properties or an increase in sheet resistance.

Furthermore, the present invention provides a method for a transparent electrode, the method including: applying a metal nanowire-dispersed liquid including metal nanowires to a substrate and drying the resultant to prepare an electrode including a metal nanowire layer (step 1); and applying the coating composition for a transparent electrode passivation layer to the top of the electrode prepared in step 1 (step 2).

Hereinafter, the method for preparing a transparent electrode according to the present invention will be described in detail for each step.

First, in the method for preparing a transparent electrode according to the present invention, step 1 is a step for applying a metal nanowire-dispersed liquid including metal nanowires to a substrate and drying the resultant to prepare an electrode including a metal nanowire layer.

The transparent electrode prepared by the method for preparing a transparent electrode according to the present invention is made of metal nanowires, and in step 1, a metal nanowire-dispersed liquid including metal nanowires is applied to a substrate and then dried to prepare an electrode including a metal nanowire layer.

The metal nanowires in step 1 are capable of ensuring electrical conductivity by forming a network. In the transparent electrode made of an electrode material including a metal nanowire layer, as the metal nanowire network is more densely formed, the electrical conductivity of the transparent electrode may be improved. However, there are problems in that the visible light transmittance of the transparent electrode is reduced and excessive costs are required.

Even if a conductive network is formed using the metal nanowires, the metal nanowires are broken due to thermodynamic instability even under the condition of only a temperature of about 200° C., and electrical and optical properties thus drastically deteriorate. Furthermore, the metal nanowires as a nanostructure are more active than conventional materials, and thus highly prone to oxidation and corrosion when exposed to the atmosphere without a passivation layer.

Particularly, while silver nanowires having a high electrical conductivity have a highly conductive property and are transparent in the visible light region, it is known that the resistance increases by about 15 to 20% due to the oxidation and corrosion in the atmosphere. Thus, there was a problem in that additional antioxidants or a plurality of passivation layers were required in order to prevent the oxidation and corrosion.

Thus, in the method for preparing a transparent electrode according to the present invention, a metal oxide and at least one compound of ethylene glycol, propylene glycol, diethylene glycol, triethylene glycol, or tetraethylene glycol are used for a passivation layer for improving the heat resistance and durability of metal nanowires. This will be later described in step 2.

Specifically, the substrate in step 1 may be a silicon substrate, a glass substrate, a poly methyl methacrylate (PMMA) substrate, a polyvinyl pyrrolidone (PVP) substrate, a polystyrene (PS) substrate, a polycarbonate (PC) substrate, a polyethersulfone (PES) substrate, a cyclic olefin copolymer (COC) substrate, a triacetylcellulose (TAC) substrate, a polyvinyl alcohol substrate, a polyimide (PI) substrate, a polyethyleneterephthalate (PET) substrate, a polyethylenenaphthalate (PEN) substrate, or the like.

The metal of the metal nanowire in step 1 may be silver, gold, copper, aluminum, nickel, tin, palladium, platinum, zinc, iron, indium, magnesium, or the like. As a preferred example, the metal nanowire may be a silver nanowire made of silver having excellent electrical conductivity.

Next, in the method for preparing a transparent electrode according to the present invention, step 2 is a step for applying the coating composition for a transparent electrode passivation layer to the top of the electrode prepared in step 1.

In step 2, the coating composition for a transparent electrode passivation layer, the coating composition including a metal oxide and at least one compound of ethylene glycol, propylene glycol, diethylene glycol, triethylene glycol, or tetraethylene glycol, is applied as a passivation layer for improving the heat resistance and durability of the metal nanowires used as an electrode material.

Particularly, when ethylene glycol or propylene glycol is used as the compound in step 2, the composition for forming a passivation layer may exhibit excellent heat resistance and durability.

Furthermore, the coating composition for a transparent electrode passivation layer in step 2 may further include an alkoxysilane-based coupling agent, and the alkoxysilane-based coupling agent may be a compound expressed by formula 1 below

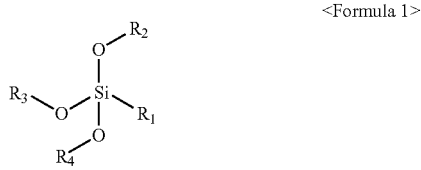

<Formula 1> where $R_1$ is a linear or branched alkyl, alkenyl, alkynyl, or aryl of $C_{1-12}$, the alkyl, alkenyl, alkynyl, or aryl may have at least one substituent of an acryl group, a methacrylic group, an alkoxy group, an amino group, a mercapto group, a phosphonate group, or an epoxy group, at least one carbon atom in the alkyl, alkenyl, alkynyl, or aryl may be substituted with at least one hetero-element selected from the group consisting of N, O, and S, and $R_2$, $R_3$, and $R_4$ are independently a hydrogen or a linear alkyl of $C_{1-4}$ or a branched alkyl of $C_{2-4}$.

As a specific example, the alkoxysilane-based coupling agent may be (3-glycidoxypropyl) methyldiethoxysilane (GPTMS), vinyltriethoxysilane (VIES), phenyl trimethoxysilane (PTMS), methyltriethoxysilane (MTES), methyltrimethoxysilane (MTMS), tetramethyl orthosilicate (TMOS), tetraethyl orthosilicate (TEOS), γ-mercaptopropyl trimethoxysilane (MPTMS), γ-methacryloxyproply trimethoxysilane (MAPTS), diethylphosphonatoethyl triethoxysilane (PHS), 3-aminopropyl trimethoxysilane (APS), 3-(2-aminoethyl)aminopropyl trimethoxysilane (AEAPS), bis-[3-(triethoxysilyl)-propyl]tetrasulfide (BTSTS), or the like.

The coating composition for a transparent electrode passivation layer according to the present invention includes the alkoxysilane-based coupling agent, thereby being capable of exhibiting excellent hardness through a coupling reaction with the metal oxide.

Furthermore, the metal oxide may be zinc oxide, titanium oxide, magnesium oxide, aluminum oxide, silicon oxide, or the like, and as a preferred example, may be zinc oxide (ZnO).

As a specific example, the transparent electrode having a passivation layer in which zinc oxide as a metal oxide and ethylene glycol as a compound expressed by formula 1 are mixed, includes zinc oxide and ethylene glycol which are coupled by strong hydrogen bonding, which further increases the decomposition temperature of zinc oxide, and may thus have excellent heat resistance and durability. When only zinc oxide is used as a passivation layer, the transmittance of the transparent electrode is reduced. However, a passivation layer in which zinc oxide and ethylene glycol are mixed is capable of maintaining the transmittance while having a higher porosity than that of a passivation layer formed of only zinc oxide.

Furthermore, the present invention provides a transparent electrode including: an electrode including a metal nanowire layer; and a passivation layer which is coated on the top of the electrode including a metal nanowire layer and which includes a metal oxide and at least of one selected from the group consisting of ethylene glycol, propylene glycol, diethylene glycol, triethylene glycol, and tetraethylene glycol.

The transparent electrode according to the present invention is made of metal nanowires. The metal nanowires are capable of ensuring electrical conductivity by forming a network. In the transparent electrode made of an electrode material including a metal nanowire layer, as the metal nanowire network is more densely formed, the electrical conductivity of the transparent electrode may be improved. However, there are problems in that the visible light transmittance of the transparent electrode is reduced and excessive costs are required.

Also, even if a conductive network is formed using the metal nanowires, the metal nanowires are broken due to thermodynamic instability even under the condition of only a temperature of about 200° C., and electrical and optical properties thus drastically deteriorate. Furthermore, the metal nanowires as a nanostructure are more active than conventional materials, and thus highly prone to oxidation and corrosion when exposed to the atmosphere without a passivation layer.

Particularly, while silver nanowires having a high electrical conductivity have a highly conductive property and are transparent in the visible light region, it is known that the resistance increases by about 15 to 20% due to the oxidation and corrosion in the atmosphere. Thus, there was a problem in that additional antioxidants or a plurality of passivation layers were required in order to prevent the oxidation and corrosion.

Thus, in the transparent electrode according to the present invention, a metal oxide, at least one compound of ethylene glycol, propylene glycol, diethylene glycol, triethylene glycol, or tetraethylene glycol, and an alkoxysilane-based coupling agent are used for a passivation layer for improving the heat resistance and durability of metal nanowires. The passivation layer including a metal oxide, at least one compound of ethylene glycol, propylene glycol, diethylene glycol, triethylene glycol, or tetraethylene glycol, and an alkoxysilane-based coupling agent improves the heat resistance and durability of the transparent electrode, maintains the transmittance of the transparent electrode, and particularly exhibits excellent hardness.

Specifically, the electrode including a metal nanowire layer may include a substrate, such as a silicon substrate, a glass substrate, a poly methyl methacrylate (PMMA) substrate, a polyvinyl pyrrolidone (PVP) substrate, a polystyrene (PS) substrate, a polycarbonate (PC) substrate, a polyethersulfone (PES) substrate, a cyclic olefin copolymer (COC) substrate, a triacetylcellulose (TAC) substrate, a polyvinyl alcohol substrate, a polyimide (PI) substrate, a polyethyleneterephthalate (PET) substrate, a polyethylenenaphthalate (PEN) substrate, or the like.

The metal of the metal nanowire may be silver, gold, copper, aluminum, nickel, tin, palladium, platinum, zinc, iron, indium, magnesium, or the like. As a preferred example, the metal nanowire may be a silver nanowire made of silver having excellent electrical conductivity.

Particularly, when ethylene glycol or propylene glycol is used as the compound, the composition for forming a passivation layer may exhibit excellent heat resistance and durability.

Furthermore, the alkoxysilane-based coupling agent may be a compound expressed by formula 1 below

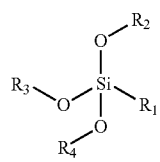
<Formula 1> where $R_1$ is a linear or branched alkyl, alkenyl, alkynyl, or aryl of $C_{1-12}$, the alkyl, alkenyl, alkynyl, or aryl may have at least one substituent of an acryl group, a methacrylic group, an alkoxy group, an amino group, a mercapto group, a phosphonate group, or an epoxy group, at least one carbon atom in the alkyl, alkenyl, alkynyl, or aryl may be substituted with at least one hetero-element selected from the group consisting of N, O, and S, and $R_2$, $R_3$, and $R_4$ are independently a hydrogen or a linear alkyl of $C_{1-4}$ or a branched alkyl of $C_{2-4}$.

As a specific example, the alkoxysilane-based coupling agent may be (3-glycidoxypropyl) methyldiethoxysilane (GPTMS), vinyltriethoxysilane (VIES), phenyl trimethoxysilane (PTMS), methyltriethoxysilane (MTES), methyltrimethoxysilane (MTMS), tetramethyl orthosilicate (TMOS), tetraethyl orthosilicate (TEOS), γ-mercaptopropyl trimethoxysilane (MPTMS), γ-methacryloxyproply trimethoxysilane (MAPTS), diethylphosphonatoethyl triethoxysilane (PHS), 3-aminopropyl trimethoxysilane (APS), 3-(2-aminoethyl)aminopropyl trimethoxysilane (AEAPS), bis-[3-(triethoxysilyl)-propyl]tetrasulfide (BTSTS), or the like.

The coating composition for a transparent electrode passivation layer according to the present invention includes the alkoxysilane-based coupling agent, thereby being capable of exhibiting excellent hardness through a coupling reaction with the metal oxide.

Furthermore, the metal oxide may be zinc oxide, titanium oxide, magnesium oxide, aluminum oxide, silicon oxide, or the like, and as a preferred example, may be zinc oxide (ZnO).

As a specific example, the transparent electrode having a passivation layer in which zinc oxide as a metal oxide and ethylene glycol as a compound expressed by formula 1 are mixed, includes zinc oxide and ethylene glycol which are coupled by strong hydrogen bonding, which further increases the decomposition temperature of zinc oxide, and may thus have excellent heat resistance and durability. When only zinc oxide is used as a passivation layer, the transmittance of the transparent electrode is reduced. However, a passivation layer in which zinc oxide and ethylene glycol are mixed may maintain the transmittance while having a higher porosity than that of a passivation layer formed of only zinc oxide.

Furthermore, the present invention provides a display including a transparent electrode including: an electrode including a metal nanowire layer; and a passivation layer which is coated on the top of the electrode including a metal nanowire layer and which includes a metal oxide, a compound expressed by formula 1, and an alkoxysilane-based coupling agent.

The display including the transparent electrode according to the present invention may have improved lifetime due to the transparent electrode having improved heat resistance, durability, and hardness while maintaining transmittance. The display may be a touch panel.

Hereinafter, the present invention will be described in detail by the following Examples and Experimental Examples.

However, the following Examples and Experimental Examples merely illustrate the present invention, and the scope of the present invention is not limited thereto.

<Example 1> Preparation 1 of Coating Composition for Transparent Electrode Passivation Layer Step 1: 1.64 g of zinc acetate dihydrate ($Zn(CH_3COO)_2 \cdot 2H_2O$, Aldrich, 99.9%) and 0.5 g of monoethanolamine ($NH_2CH_2CH_2OH$, Aldrich, 95%) were added to 10 g of 2-methoxyethanol ($CH_3OCH_2CH_2OH$, Aldrich, 99.8%), and then subjected to a hydrolysis reaction for 30 minutes in air at 60° C. to prepare a metal oxide sol-gel solution.

Step 2: 12.14 g of ethylene glycol (EG), which was calculated with a weight ratio of the sol-gel solution to ethylene glycol being 1:1, was added to the metal oxide sol-gel solution prepared in step 1, and then stirred for 1 hour to prepare a coating composition for a transparent electrode passivation layer.

<Example 2> Preparation 2 of Coating Composition for Transparent Electrode Passivation Layer A coating composition for a transparent electrode passivation layer was prepared in the same manner as in Example 1 except that, in step 2 of Example 1, 3.035 g of ethylene glycol, which was calculated with a weight ratio of the sol-gel solution to ethylene glycol being 1:0.25, was added.

<Example 3> Preparation 3 of Coating Composition for Transparent Electrode Passivation Layer A coating composition for a transparent electrode passivation layer was prepared in the same manner as in Example 1 except that, in step 2 of Example 1, 48.56 g of ethylene glycol, which was calculated with a weight ratio of the sol-gel solution to ethylene glycol being 1:4, was added.

<Example 4> Preparation 4 of Coating Composition for Transparent Electrode Passivation Layer A coating composition for a transparent electrode passivation layer was prepared in the same manner as in Example 1 except that, in step 2 of Example 1, propylene glycol was used instead of ethylene glycol.

<Example 5> Preparation 5 of Coating Composition for Transparent Electrode Passivation Layer A coating composition for a transparent electrode passivation layer was prepared in the same manner as in Example 1 except that, in step 2 of Example 1, diethylene glycol was used instead of ethylene glycol.

<Example 6> Preparation 6 of Coating Composition for Transparent Electrode Passivation Layer A coating composition for a transparent electrode passivation layer was prepared in the same manner as in Example 1 except that, in step 2 of Example 1, triethylene glycol was used instead of ethylene glycol.

<Example 7> Preparation 7 of Coating Composition for Transparent Electrode Passivation Layer A coating composition for a transparent electrode passivation layer was prepared in the same manner as in Example 1 except that, in step 2 of Example 1, tetraethylene glycol was used instead of ethylene glycol.

<Example 8> Preparation 8 of Coating Composition for Transparent Electrode Passivation Layer Step 1: 1.64 g of zinc acetate dihydrate ($Zn(CH_3COO)_2 \cdot 2H_2O$, Aldrich, 99.9%) and 0.5 g of monoethanolamine ($NH_2CH_2CH_2OH$, Aldrich, 95%) were added to 10 g of 2-methoxyethanol ($CH_3OCH_2CH_2OH$, Aldrich, 99.8%), and then subjected to a hydrolysis reaction for 30 minutes in air at 60° C. to prepare a metal oxide sol-gel solution.

Step 2: 12.14 g of ethylene glycol (EG), which was calculated with a weight ratio of the sol-gel solution to ethylene glycol being 1:1, was added to the metal oxide sol-gel solution prepared in step 1, 3 wt % of (3-glycidoxypropyl) methyldiethoxysilane (GPTMS) was further added with respect to the total weight of the sol-gel solution and ethylene glycol, and then stirred for 1 hour to prepare a coating composition for a transparent electrode passivation layer.

<Example 9> Preparation 9 of Coating Composition for Transparent Electrode Passivation Layer A coating composition for a transparent electrode passivation layer was prepared in the same manner as in Example 8 except that, in step 2 of Example 8, propylene glycol was used instead of ethylene glycol.

<Example 10> Preparation 10 of Coating Composition for Transparent Electrode Passivation Layer A coating composition for a transparent electrode passivation layer was prepared in the same manner as in Example 8 except that, in step 2 of Example 8, diethylene glycol was used instead of ethylene glycol.

<Example 11> Preparation 11 of Coating Composition for Transparent Electrode Passivation Layer A coating composition for a transparent electrode passivation layer was prepared in the same manner as in Example 8 except that, in step 2 of Example 8, triethylene glycol was used instead of ethylene glycol.

<Example 12> Preparation 12 of Coating Composition for Transparent Electrode Passivation Layer A coating composition for a transparent electrode passivation layer was prepared in the same manner as in Example 8 except that, in step 2 of Example 8, tetraethylene glycol was used instead of ethylene glycol.

<Examples 13 to 24> Preparation 1 to 12 of Transparent Electrodes

Step 1: A silver nanowire dispersed solution, in which 0.3 mg of silver nanowires having an average diameter of 25 nm and an average length of 20 µm were dispersed in 1 mL of deionized water, was applied to a glass substrate and dried to prepare an electrode including a silver nanowire layer.

Step 2: the compositions prepared in Examples 1 to 12 were independently applied to the top of the electrode, which includes a silver nanowire layer and which was prepared in step 1, to prepare transparent electrodes.

Examples 25 to 28

Coating compositions for a transparent electrode passivation layer were prepared in the same manner as in Example 8 except that, in step 2 in Example 8, 1 wt %, 2 wt %, 4 wt %, and 5 wt % of (3-glycidoxypropyl) methyldiethoxysilane (GPTMS) were respectively added with respect to the total weight of the sol-gel solution and ethylene glycol.

<Examples 29 to 32> Preparation 13 to 16 of Transparent Electrodes

Step 1: A silver nanowire dispersed solution, in which 0.3 mg of silver nanowires having an average diameter of 25 nm and an average length of 20 µm were dispersed in 1 mL of deionized water, was applied to a glass substrate and dried to prepare an electrode including a silver nanowire layer.

Step 2: the compositions prepared in Examples 25 to 28 were independently applied to the top of the electrode, which includes a silver nanowire layer and which was prepared in step 1, to prepare transparent electrodes.

<Comparative Example 1> Composition 1 for Transparent Electrode Passivation Layer Including Only Metal Oxide 1.64 g of zinc acetate dihydrate ($Zn(CH_3COO)_2 \cdot 2H_2O$, Aldrich, 99.9%) and 0.5 g of monoethanolamine ($NH_2CH_2CH_2OH$, Aldrich, 95%) were added to 10 g of 2-methoxyethanol ($CH_3OCH_2CH_2OH$, Aldrich, 99.8%), and then subjected to a hydrolysis reaction for 30 minutes in air at 60° C. to prepare a metal oxide sol-gel solution.

<Comparative Example 2> Composition 2 for Transparent Electrode Passivation Layer Including Metal Oxide Step 1: 1.64 g of zinc acetate dihydrate ($Zn(CH_3COO)_2 \cdot 2H_2O$, Aldrich, 99.9%) and 0.5 g of monoethanolamine ($NH_2CH_2CH_2OH$, Aldrich, 95%) were added to 10 g of 2-methoxyethanol ($CH_3OCH_2CH_2OH$, Aldrich, 99.8%), and then subjected to a hydrolysis reaction for 30 minutes in air at 60° C. to prepare a metal oxide sol-gel solution.

Step 2: 0.3642 g of (3-glycidoxypropyl) methyldiethoxysilane (GPTMS) was added to the metal oxide sol-gel solution prepared in step 1, and then stirred for 1 hour to prepare a coating composition for a transparent electrode passivation layer.

<Comparative Example 3> Composition 1 for Transparent Electrode Passivation Layer Including Metal Oxide and Polymer A coating composition for a transparent electrode passivation layer was prepared in the same manner as in Example 8 except that, in step 2 of Example 8, polyethylene glycol 4,000 (PEG 4,000) having a number-average molecular weight of 4,000 was used instead of ethylene glycol.

<Comparative Example 4> Composition 2 for Transparent Electrode Passivation Layer Including Metal Oxide and Polymer A coating composition for a transparent electrode passivation layer was prepared in the same manner as in Example 8 except that, in step 2 of Example 8, polyethylene glycol 10,000 (PEG 10,000) having a number-average molecular weight of 10,000 was used instead of ethylene glycol.

<Comparative Example 5> Composition for Passivation Layer in Prior Art 0.4069 g of zinc acetate dihydrate ($Zn(CH_3COO)_2 \cdot 2H_2O$, Aldrich, 99.9%) and 0.1 g of acetylacetone were added to a solution, in which 5 g of methanol and 5 g of ethanol were mixed, and then subjected to a hydrolysis reaction for 30 minutes in air at 50° C. to prepare a metal oxide sol-gel solution.

<Comparative Example 6> Transparent Electrode Having Only Silver Nanowire Layer

A silver nanowire dispersed solution, in which 0.3 mg of silver nanowires having an average diameter of 25 nm and an average length of 20 μm were dispersed in 1 mL of deionized water, was applied to a glass substrate and dried to prepare an electrode including only a silver nanowire layer.

Comparative Examples 7 to 11

Step 1: A silver nanowire dispersed solution, in which 0.3 mg of silver nanowires having an average diameter of 25 nm and an average length of 20 μm were dispersed in 1 mL of deionized water, was applied to a glass substrate and dried to prepare an electrode including a silver nanowire layer.

Step 2: The compositions prepared in Comparative Examples 1 to 5 were independently applied to the top of the electrode, which includes a silver nanowire layer and which was prepared in step 1, to prepare transparent electrodes.

Comparative Example 12

Step 1: A silver nanowire dispersed solution, in which 0.3 mg of silver nanowires having an average diameter of 25 nm and an average length of 20 μm were dispersed in 12.14 g of ethylene glycol, 1.64 g of zinc acetate dihydrate ($Zn(CH_3COO)_2 \cdot 2H_2O$, Aldrich, 99.9%), and 0.5 g of monoethanolamine ($NH_2CH_2CH_2OH$, Aldrich, 95%) were added to 10 g 2-methoxyethanol ($CH_3OCH_2CH_2OH$, Aldrich, 99.8%), then subjected to a hydrolysis reaction for 30 minutes in air at 60° C. to prepare a metal oxide sol-gel solution, and then stirred for 1 hour to prepare a single liquid-based mixture.

Step 2: The single liquid-based mixture prepared in step 1 was applied to a glass substrate and dried to prepare a transparent electrode.

<Experimental Example 1> Characteristic Analysis of Transparent Electrode Having Silver Nanowire Layer In order to confirm characteristics of a transparent electrode having only a silver nanowire layer, the silver nanowire transparent electrode prepared in Comparative Example 6 was independently heated to 200° C., 300° C., and 450° C., and then the characteristics thereof were analyzed through SEM observation, resistance measurements using four point probe and multimeter, and UV-Vis spectroscopy. The results are shown in FIG. 1.

As shown in FIG. 1, it could be seen that when the silver nanowire transparent electrode, which has no passivation layer and which was prepared in Comparative Example 6, was heated to 200° C., the silver nanowire transparent electrode was broken, the resistance was thus rapidly increased, and the light transmittance was also reduced.

<Experimental Example 2> Analysis of Electrical Conductivity and Light Transmittance of Transparent Electrode In order to confirm the electrical conductivity and light transmittance of the transparent electrode according to the present invention, the following experiments were conducted.

(1) The electrodes prepared in Example 13 and Comparative Examples 6 and 7; glass; zinc oxide (ZnO)-coated glass; and zinc oxide & ethylene glycol (EG)-coated glass were analyzed using SEM and UV-Vis spectroscopy. The results are shown in FIG. 2.

As shown in FIG. 2, in the case of Example 13 in which the transparent electrode includes a passivation layer formed of zinc oxide (ZnO) and ethylene glycol (EG), it could be seen that the light transmittance was similar to that in the case of Comparative Example 6 in which the transparent electrode has no passivation layer.

On the other hand, in the case of Comparative Example 7 in which the transparent electrode includes a zinc oxide (ZnO) passivation layer, it could be seen that the light transmittance was lower than those of the transparent electrodes in Example 13 and Comparative Example 6.

In this case, from the light transmittances of zinc oxide (ZnO)-coated glass and zinc oxide & ethylene glycol (EG)-coated glass, it could be seen that the light transmittance of the glass coated with only zinc oxide was insufficient. As shown in SEM images, it can be seen that the transmittance of the glass coated with zinc oxide and ethylene glycol is improved due to its higher porosity than that the glass coated with only zinc oxide.

(2) The transparent electrodes prepared in Example 13 and Comparative Examples 6 and 7 were analyzed through UV-Vis spectroscopy, and resistance measurements using four point probe and multimeter. The results are shown in FIGS. 3 and 4.

As shown in FIG. 3, from the experimental result of the heat resistance of the silver nanowire transparent electrode which has no passivation layer and which was prepared in Comparative Example 6, it could be seen that a sharp increase in resistance was observed even at only a temperature of 200° C.

In the case of Comparative Example 7 in which the transparent electrode includes a zinc oxide (ZnO) passivation layer, it could be seen that the resistance was maintained below 350° C., but rapidly increased above 350° C.

On the other hand, in the case of Example 13 in which the transparent electrode includes a passivation layer formed of zinc oxide (ZnO) and ethylene glycol (EG) according to the present invention, it could be seen that the resistance was maintained up to 450° C.

Furthermore, as shown in FIG. 4, in the case of Comparative Example 7 in which the transparent electrode includes a zinc oxide (ZnO) passivation layer, it could be seen that the light transmittance was reduced under the condition of a temperature of 450° C. This is because silver nanowires are broken.

On the other hand, in the case of Example 13 in which the transparent electrode includes a passivation layer formed of zinc oxide (ZnO) and ethylene glycol (EG) according to the present invention, it could be seen that there was no change in transmittance even under the condition of a temperature of 450° C.

(3) The transparent electrodes prepared in Examples 13 and 16 to 19 and Comparative Examples 6 and 7 were analyzed through UV-Vis spectroscopy, and resistance measurements using four point probe and multimeter. The results are shown in FIGS. 5 and 6.

As shown in FIG. 5, in the cases of Examples 13 and 16 to 19 in each of which the transparent electrode includes a passivation layer formed of zinc oxide (ZnO) and a compound according to the present invention, it could be seen that the transmittances were similar to that of the silver nanowire transparent electrode prepared in Comparative Example 6.

Furthermore, as shown in FIG. 6, from the experimental results of the heat resistances of transparent electrodes, it could be seen that the transparent electrodes, each of which includes a passivation layer formed of zinc oxide (ZnO) and a compound according to the present invention, maintained the resistances for 30 minutes or more even under the condition of a temperature of 450° C.

Particularly, in the cases of Examples 13 and 16 in which a passivation layer was formed respectively using ethylene glycol and propylene glycol as a compound, it could be seen that the resistances did not change even after 1 hour under the condition of a temperature of 450° C.

Thus, it could be seen that when a passivation layer formed using the coating composition for a transparent electrode passivation layer according to the present invention was applied to a transparent electrode, the passivation layer was capable of ensuring the heat resistance and durability of the transparent electrode while maintaining the transmittance of the transparent electrode.

(4) The transparent electrodes prepared in Examples 20 to 24 and Comparative Examples 6 and 8 to 10 were analyzed through resistance measurements using four point probe and multimeter. The results are shown in FIGS. 7 and 8.

As shown in FIGS. 7 and 8, from the experimental results of the heat resistances of transparent electrodes, it could be seen that the transparent electrodes, each of which includes a passivation layer formed of zinc oxide (ZnO) and a compound according to the present invention, maintained the resistances for 40 minutes or more even under the condition of a temperature of 450° C.

Particularly, in the cases of Examples 20 and 21 in which a passivation layer was formed respectively using ethylene glycol and propylene glycol as a compound, it could be seen that the resistances did not change even after 1 hour under the condition of a temperature of 450° C.

On the other hand, in the cases of Comparative Examples 9 and 10 in each of which a passivation layer was formed using a polymer, it could be seen that the transparent electrodes were damaged within 20 minutes under the condition of a temperature of 450° C.

Thus, it could be seen that when a passivation layer formed using the coating composition for a transparent electrode passivation layer according to the present invention was applied to a transparent electrode, the passivation layer was capable of ensuring the heat resistance and durability of the transparent electrode while maintaining the transmittance of the transparent electrode.

<Experimental Example 3> Atomic Force Microscope Analysis

In order to confirm the surface morphology of the transparent electrode according to the present invention, the electrodes prepared in Example 13 and Comparative Examples 6 and 7 were analyzed using atomic force microscope. The results are shown in FIG. 9.

As shown in FIG. 9, it could be seen that the silver nanowire transparent electrode, which has no passivation layer and which was prepared in Comparative Example 6, had very rough surface characteristics.

In the case of Comparative Example 7 in which the transparent electrode includes a zinc oxide (ZnO) passivation layer, it could be seen that the surface characteristics were slightly improved.

Particularly, in the case of Example 13 in which the transparent electrode includes a passivation layer formed of zinc oxide (ZnO) and ethylene glycol (EG) according to the present invention, it could be seen that the surface morphology was very smooth.

<Experimental Example 4> Differential Thermogravimetric Analysis (DTG) and Thermogravimetry Analysis (TGA)

In order to confirm mechanisms for excellent heat resistance of the transparent electrode passivation layer according to the present invention, a mixture of zinc oxide (ZnO) and ethylene glycol (EG) was analyzed using differential thermogravimetric analysis (DTG) and thermogravimetry analysis (TGA). The results are shown in FIG. 10.

As shown in FIG. 10, excellent heat resistance of the passivation layer including zinc oxide and ethylene glycol (EG) according to the present invention is due to an increase in the decomposition temperature of zinc oxide by strong hydrogen bonding between zinc oxide and ethylene glycol as the result of TGA. Thus, the passivation layer including zinc oxide and ethylene glycol (EG) has excellent heat resistance compared to a passivation layer formed of only zinc oxide.

<Experimental Example 5> Chemical Stability Analysis

In order to confirm the chemical stability of the transparent electrode passivation layer according to the present invention, after sodium sulfide ($Na_2S$) was applied to electrodes prepared in Example 13 and Comparative Example 6, resistance variations according to time were observed. The results are shown in FIG. 11.

As shown in FIG. 11, in the case of the silver nanowire transparent electrode which has no passivation layer and which was prepared in Comparative Example 6, it could be seen that the silver nanowire transparent electrode exhibited a sharply increased resistance due to a high reactivity when exposed to sulfur.

On the other hand, in the case of Example 13 in which the transparent electrode includes a passivation layer formed of zinc oxide (ZnO) and ethylene glycol (EG) according to the present invention, it could be seen that the transparent electrode exhibited excellent durability even when exposed to sulfur.

<Experimental Example 6> Analysis of Optical Properties, Sheet Resistance, Hardness, and Dispersibility In order to confirm effect of an alkoxysilane-based coupling agent on the transparent electrode passivation layer according to the present invention, optical properties (transmittance, haze, *b), sheet resistances, hardnesses, and dispersibilities of the electrodes prepared in Examples 13, 20, and 29 to 32, and Comparative Examples 6 to 9 and 11, were analyzed. The results are shown in Tables 1 and 2 below.

TABLE 1

| | Transmittance (%) | Haze | *b | Sheet Resistance (Ω) | Hardness |
|---|---|---|---|---|---|
| Example 13 | 87.12 | 1.04 | 2.61 | 54 | 3B |
| Example 29 | 87.63 | 1.11 | 2.27 | 62 | 2B |
| Example 30 | 87.78 | 1.05 | 2.16 | 57 | 2B |
| Example 20 | 89.72 | 0.70 | 2.10 | 56 | 2H |
| Example 31 | 88.54 | 0.96 | 2.02 | 70 | 4H |
| Example 32 | 85.08 | 1.18 | 3.01 | 150 | 4H |

*b: a value indicating a color region from yellow to blue

TABLE 2

| | Transmittance (%) | Haze | *b | Sheet Resistance (Ω) | Dispersibility |
|---|---|---|---|---|---|
| Example 13 | 87.12 | 1.04 | 2.61 | 54 | Good |
| Example 20 | 87.63 | 1.11 | 2.27 | 62 | Good |
| Comparative Example 6 | 86.33 | 1.34 | 1.89 | 52 | Good |
| Comparative Example 7 | 87.07 | 1.19 | 2.01 | 65 | Good |
| Comparative Example 8 | 87.51 | 1.37 | 2.49 | 67 | Good |
| Comparative Example 9 | 87.62 | 1.35 | 2.78 | 74 | Good |
| Comparative Example 11 | 72.78 | 12.95 | 9.68 | 5,500~10,000 | Bad |

*b: a value indicating a color region from yellow to blue

As shown in Table 1, it could be seen that hardnesses increased in Examples including the compound of formula 1 according to the present invention, and particularly, Example 20 including 3 wt % of methyldiethoxysilane exhibited excellent hardness in addition to excellent optical properties.

Furthermore, it could be seen that Example 20 exhibited excellent sheet resistance as well as excellent optical properties (transmittance, haze, and *b).

Furthermore, as shown in Table 2, it could be seen that while the coating composition for a passivation layer according to the present invention exhibited excellent optical properties and sheet resistance as well as excellent dispersibility, conventional methods were problematic in that optical properties slightly deteriorated or sheet resistances were high, and particularly it was difficult to prepare as a single liquid-based composition.

What is claimed is:

1. A coating composition for a transparent electrode passivation layer, the coating composition comprising:
   a metal oxide;
   an alkoxysilane-based coupling agent;
   and at least one selected from the group consisting of ethylene glycol, propylene glycol, diethylene glycol, triethylene glycol, and tetraethylene glycol,
   wherein the content of the alkoxysilane-based coupling agent is 2.5 wt % to 3.5 wt % with respect to the total weight of the composition.

2. The coating composition for a transparent electrode passivation layer of claim 1, wherein the metal oxide is at least one selected from the group consisting of zinc oxide, titanium oxide, magnesium oxide, aluminum oxide, and silicon oxide.

3. The coating composition for a transparent electrode passivation layer of claim 1, wherein the transparent electrode includes a metal nanowire layer.

4. The coating composition for a transparent electrode passivation layer of claim 3, wherein the metal of the metal nanowire is at least one selected from the group consisting of silver, gold, copper, aluminum, nickel, tin, palladium, platinum, zinc, iron, indium, and magnesium.

5. A method for preparing a coating composition for a transparent electrode passivation layer, the method comprising:
   preparing a sol-gel solution including a metal oxide (step 1); and
   adding at least one composition selected from the group consisting of ethylene glycol, propylene glycol, diethylene glycol, triethylene glycol, and tetraethylene glycol to the sol-gel solution prepared in step 1 and an alkoxysilane-based coupling agent (step 2),
   wherein the content of the alkoxysilane-based coupling agent is 2.5 wt % to 3.5 wt % with respect to a solution.

6. The method for preparing a coating composition for a transparent electrode passivation layer of claim 5, wherein the sol-gel solution in step 1 includes a metal oxide precursor, a stabilizer, and a solvent.

7. The method for preparing a coating composition for a transparent electrode passivation layer of claim 5, wherein the sol-gel solution and a compound expressed by

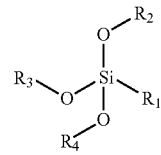

are mixed, in step 2, at a weight ratio of 1:0.1 to 4.0.

8. The method for preparing a coating composition for a transparent electrode passivation layer of claim 5, wherein the alkoxysilane-based coupling agent is including at least one selected from the group consisting of ethylene glycol, propylene glycol, diethylene glycol, triethylene glycol, and tetraethylene glycol.

9. A method for preparing a transparent electrode, the method comprising: applying a metal nanowire-dispersed liquid including metal nanowires to a substrate and drying the resultant to prepare an electrode including a metal nanowire layer (step 1); and applying the coating composition for a transparent electrode passivation layer of claim 1 to the top of the electrode prepared in step 1 (step 2).

10. The coating composition for a transparent electrode passivation layer of claim 1, wherein the alkoxysilane-based coupling agent is a compound expressed by

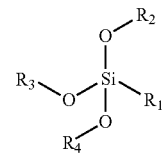

where R1 is a linear or branched alkyl, alkenyl, alkynyl, or aryl of C1-12, the alkyl, alkenyl, alkynyl, or aryl may have at least one substituent of an acryl group, a methacrylic group, an alkoxy group, an amino group, a mercapto group, a phosphonate group, or an epoxy group, at least one carbon atom in the alkyl, alkenyl, alkynyl, or aryl may be substituted with at least one hetero-element selected from the group consisting of N, O, and S, and R2, R3, and R4 are independently a hydrogen or a linear alkyl of C1-4 or a branched alkyl of C2-4.

* * * * *